May 26, 1925.

T. D. ADAIR, JR 1,539,531

SPEEDOMETER DRIVING MECHANISM

Filed June 14, 1924

Witness:

Alfred H. McGlinchey

Inventor:
Thomas Donald Adair Jr
by his attorneys
Van Duren Fish Hildreth
& Carey

Patented May 26, 1925.

1,539,531

UNITED STATES PATENT OFFICE.

THOMAS DONALD ADAIR, JR., OF ATLANTIC, MASSACHUSETTS, ASSIGNOR TO STANDARD THERMOMETER COMPANY, OF PORTLAND, MAINE, A CORPORATION OF MAINE.

SPEEDOMETER-DRIVING MECHANISM.

Application filed June 14, 1924. Serial No. 720,038.

*To all whom it may concern:*

Be it known that I, THOMAS DONALD ADAIR, Jr., a citizen of the United States, residing at Atlantic, in the county of Norfolk and State of Massachusetts, have invented certain new and useful Improvements in Speedometer-Driving Mechanisms; and I do hereby declare the following to be a full, clear, and exact description of the invention, such as will enable others skilled in the art to which it appertains to make and use the same.

The present invention relates to an improvement in speedometer driving mechanisms.

The object of the invention is to reorganize and improve speedometer driving mechanisms for the purpose of simplifying its construction, improving wearing conditions, and rendering it less expensive. To the above ends the invention consists in the speedometer driving mechanism hereinafter described and particularly defined in the claims.

Figure 1:
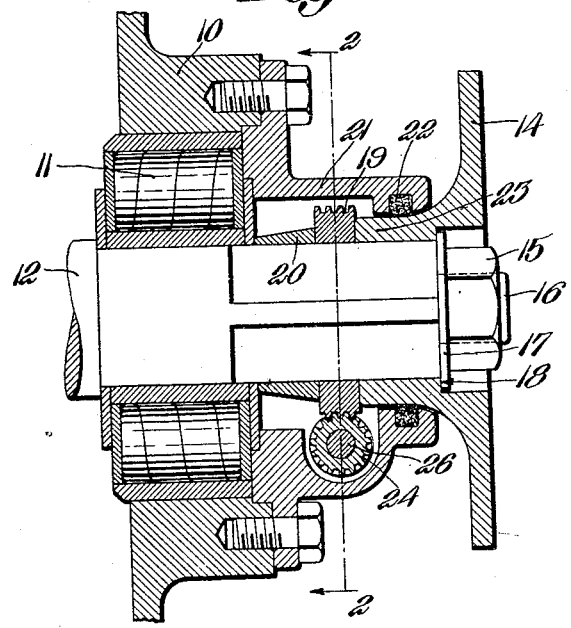
Figure 2:
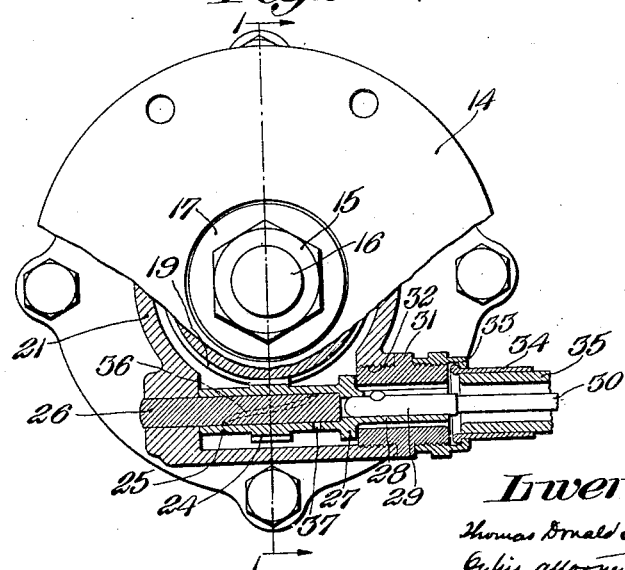

In the accompanying drawings illustrating the preferred form of the invention, Fig. 1 is a sectional longitudinal elevation of a portion of the transmission gearing taken on the line 1—1, Fig. 2; and Fig. 2 is a section taken on the line 2—2, Fig. 1.

The illustrated embodiment is described as follows: The transmission housing 10 carries the bearing 11 which supports the rear end of the driving shaft 12. The driving shaft carries on its end a coupling plate 14 by which it is connected in the usual manner to the propeller shaft. The coupling plate 14 is secured to the driving shaft by the nut 15 which is screwed on the reduced portion 16 on the end of the shaft, a washer 17 being interposed between the nut and the shoulder 18 on the coupling plate. The driving shaft also carries a worm 19. A spacer ring 20 between the worm and the bearing 11 holds the worm in correct longitudinal position on the driving shaft. The supplemental housing 21 encloses the worm 19 and is provided with a gasket 22 which engages the outside surface of the hub 23 of the coupling plate 14, thereby preventing ingress of dirt and egress of oil and grease. The worm 19 meshes with a worm wheel 24. This worm wheel being driven by the worm 19, rotates at a certain speed in relation thereto, and constitutes the member from which the speedometer drive shaft is driven. This worm wheel 24 is provided with a long hub 25, which extends in opposite directions from the worm wheel 24. This hub 25 is centrally bored to form a bearing for the wheel. This bearing receives the spindle 26, which it fits with a running fit. The spindle 26 is supported in the supplemental housing 21 in a hole therein by a drive fit. The hub 25 of the worm wheel engages at one end the wall of the housing, and is thereby prevented from movement in that direction by such engagement. At the other end of the worm wheel hub 25 it is provided with a collar 27, that is to say, an enlargement, which is for the purpose of stiffening the hub and constituting an end bearing for the hub at this end thereof. From the collar 27 there extends the coupling sleeve 28, which is bored longitudinally to receive the flexible shaft tip 29 of the flexible shaft 30. A plug 31 is provided, which is screwed into the screw-threaded opening 32 of the supplemental housing, the flange on the plug taking against the surface of the housing and thereby bottoming the plug in correct position to engage with a free running fit the face of the collar 27 on the end of the worm wheel hub. The outer end of the plug 31 is screw-threaded to receive the coupling ferrule 33, which engages the ferrule 34 of the flexible housing 35 of the flexible shaft 30, and couples it securely to the supplemental housing.

The spindle pin 26 is provided with a spiral oil groove 36, and the hub of the worm wheel is provided with oil holes 37, through which lubricant may enter from the supplemental housing.

The construction lends itself to convenient production by reason of the fact that the boring of the hole in the housing to receive the spindle pin 26 is the only hole that is required to be made with the greatest nicety in order to secure the proper engagement of the worm and worm wheel. The pin constitutes the only bearing for the worm wheel. The worm wheel bearing is distributed on both sides of the worm wheel so that the wheel is well supported, and good bearing conditions are secured. Furthermore, the bearing is a long bearing and will therefore be durable.

The mechanism is assembled by forcing the spindle into the hole in the supplemental housing which is to receive it, then inserting the worm wheel in place, after which the plug 31 is inserted and screwed up tight against the boss on the housing, the length of the threaded portion of the hub extending into the aperture of the supplemental housing being such as to approach closely to the collar 27 on the hub of the worm wheel, but not to touch it, after which the flexible drive shaft will be inserted in the connecting sleeve 28 of the worm wheel, and the ferrule 33 will be screwed on to the projecting end of the plug 31 to secure the flexible shaft housing in place. It is important from a cost aspect to avoid extreme precision in threading the aperture of the supplemental housing which receives the threaded end of the plug 31, and therefore it is necessary that the end of the plug should not come in actual contact with the collar on the worm wheel.

The important features of the present construction are the provision of a large bearing equally distributed on both sides of the worm wheel so that the worm wheel is adequately supported under good wearing conditions with respect to the worm. Furthermore, this construction permits the use of dissimilar bearing metals without the necessity of bushings. Thus, the spindle pinion may be made of bronze, and the worm wheel of steel. Again, the reduced connecting sleeve of the worm wheel is spaced apart from the plug which closes the aperture in the housing, and no nice accuracy of machine work is required in drilling and threading this aperture. Considerable variation from precise position may be had without impairing the usefulness and durability of the construction. The plug which closes the entrance serves to retain the worm wheel in position, and in addition forms a connection for the flexible armor tubing which encloses the flexible driving shaft.

Having thus described the invention, what is claimed is:

1. Speedometer driving mechanism having, in combination, a transmission case, a supplemental housing, a driving shaft mounted in the transmission case and extending into the supplemental housing, a worm secured on the driving shaft within the supplemental housing, a worm wheel provided with a hub extended axially in both directions from the wheel, said worm wheel having a spindle bearing therein extending from end to end of the hub, a spindle pin supported in the supplemental housing and extended into the bearing of the worm wheel, and a speedometer drive shaft, said worm wheel hub being provided with a coupling connection or extension on the opposite end of the hub from the spindle pin.

2. Speedometer driving mechanism having, in combination, a transmission case, a supplemental housing, a driving shaft mounted in the transmission case and extended into the supplemental housing, a worm secured to the driving shaft within the supplemental housing, a worm wheel provided with a hub extended axially in both directions from the wheel and having a spindle bearing therein extended from end to end of the hub, and a spindle pin supported in the supplemental housing and extended into the bearing of the worm wheel.

3. Speedometer driving mechanism having, in combination, a transmission case, a supplemental housing, a driving shaft mounted in the transmission case and extending into the supplemental housing, a worm secured on the driving shaft within the supplemental housing, a worm wheel having an internal bearing therein, a spindle pin supported in the supplemental housing and extended into the bearing in the worm wheel, a speedometer drive shaft, said worm wheel being provided with a coupling connection or extension on the opposite side of the worm wheel from the spindle pin.

4. Speedometer driving mechanism having, in combination, a transmission case, a supplemental housing, a driving shaft mounted in the transmission case and extending into the supplemental housing, a worm secured on the driving shaft within the supplemental housing, a worm wheel provided with a hub, said worm wheel hub having an internal bearing therein, a spindle pin supported in the supplemental housing and extended into the bearing in the worm wheel hub, a speedometer drive shaft, said worm wheel being provided with a coupling connection or extension on the opposite end of the hub from the spindle pin.

5. Speedometer driving mechanism having, in combination, a transmission case, a supplemental housing, a driving shaft mounted in the transmission case and extended into the supplemental housing, a worm secured to the driving shaft within the supplemental housing, a worm wheel provided with a hub extended axially from the wheel and having an internal bearing therein, and a spindle pin supported in the supplemental housing and extended into the bearing of the worm wheel.

6. Speedometer driving mechanism having, in combination, a transmission case, a supplemental housing, a driving shaft mounted in the transmission case and extending into the supplemental housing, a worm secured on the driving shaft within the supplemental housing, a worm wheel provided with a hub extended axially from the worm wheel and enclosing a bearing surface, a spindle pin supported by the supplemental housing, said spindle pin forming a bearing for said worm wheel and upon which the worm wheel rotates.

In testimony whereof I have signed my name to this specification.

THOMAS DONALD ADAIR, Jr.